(12) United States Patent
Dolganow

(10) Patent No.: US 7,940,753 B2
(45) Date of Patent: May 10, 2011

(54) ENHANCING ROUTING OPTIMALITY IN IP NETWORKS REQUIRING PATH ESTABLISHMENT

(75) Inventor: Andrew Dolganow, Kanata (CA)

(73) Assignee: Alcatel Lucent, Paris (FR)

( * ) Notice: Subject to any disclaimer, the term of this patent is extended or adjusted under 35 U.S.C. 154(b) by 491 days.

(21) Appl. No.: 11/987,319

(22) Filed: Nov. 29, 2007

(65) Prior Publication Data
US 2009/0141636 A1    Jun. 4, 2009

(51) Int. Cl.
*H04L 12/50* (2006.01)
(52) U.S. Cl. ........ 370/386; 370/230; 370/235; 370/238; 370/396; 370/377
(58) Field of Classification Search ............... 370/235, 370/235.1, 237, 228, 230, 238, 389, 377, 370/386, 396, 337
See application file for complete search history.

(56) References Cited

U.S. PATENT DOCUMENTS

| | | | | |
|---|---|---|---|---|
| 2002/0186658 A1* | 12/2002 | Chiu et al. | ..................... | 370/237 |
| 2005/0185645 A1* | 8/2005 | Seppanen | ..................... | 370/389 |
| 2005/0232263 A1* | 10/2005 | Sagara | ........................ | 370/389 |
| 2005/0259664 A1* | 11/2005 | Vasseur et al. | ........... | 370/395.52 |
| 2006/0092935 A1* | 5/2006 | Lakshman et al. | ........... | 370/389 |
| 2006/0098657 A1* | 5/2006 | Vasseur et al. | ............... | 370/392 |
| 2006/0159009 A1* | 7/2006 | Kim et al. | ...................... | 370/216 |
| 2006/0176820 A1 | 8/2006 | Vasseur | | |
| 2006/0182035 A1* | 8/2006 | Vasseur | ........................ | 370/238 |
| 2008/0089227 A1* | 4/2008 | Guichard et al. | ............. | 370/228 |
| 2008/0151896 A1* | 6/2008 | Zhang | .......................... | 370/392 |
| 2008/0205271 A1* | 8/2008 | Aissaoui et al. | ............. | 370/235 |

OTHER PUBLICATIONS

Farrel et al.; ("A Path Computation Element ( PCE)-Based Architecture", 2006) ; Network Working Group; pp. 1-51.*
Yannuzzi, Marcelo, et, al., On the Challenges of Establishing Disjoint Qos IP/MPLS Paths Across Multiple Domains, IEEE Communications Magazine, Dec. 2006.

(Continued)

*Primary Examiner* — Ricky Ngo
*Assistant Examiner* — Dewanda Samuel
(74) *Attorney, Agent, or Firm* — Kramer & Amado, PC

(57) ABSTRACT

A system and related method for enhancing routing optimality in IP networks requiring path establishment, including one or more of the following: first and second network clouds including a plurality of communication elements, ones of the plurality of communication elements in the network clouds being first and second communication element, the network clouds having boundaries beyond which each of the plurality of communication elements are unable to see a connectivity between any other communication elements outside the respective network clouds; a path computational element that automatically computes an explicit optimal network route between the first and second communication elements and having an overview of all communication elements in the network clouds, the path computational element providing the computed explicit optimal network route to a routing engine; commissioning a path through the first network cloud and the second network cloud from the first communication element to the second communication element using the provided explicit optimal network route; establishing a path using the computed explicit optimal network route; switching to an alternative route that is inferior to the computed explicit optimal network route upon a failure of the computed explicit optimal network route to function properly; attempting to renegotiate the commissioned path to the computed explicit optimal network route; determining that the explicit optimal network route is again available; and switching the commissioned path back to the computed explicit optimal network route when that route is determined to be again available.

22 Claims, 3 Drawing Sheets

OTHER PUBLICATIONS

Sprintson, A et, al., Reliable Routing with Qos Guarantees for Multi-Domain IP/MPLS Networks, IEEE, 2007.

Sharma, V. et, al., Framework for Multi-Protocol Label Switching (MPLS)—based Recovery Network Working Group RFC 3469, XP-00225248, pp. 1-41.

Mohamad, Ahmad Suffian, et, al., Deployment Strategies on PCE-based Inter-AS LSP Path Computation.

Choi, Jun Kyun et, al., Fast End-to-End Restoration Mechanism with SRLG using Centralized Control draft-choi-pce-e2e-centralized-restoration-srlg-06.txt, Network Working Group, Aug. 2006, pp. 1-23.

Aslam, Faisal, et, al., Interdomain Path Computation: Challenges and Solutions for Label Switched Networks, IEEE Communications Magazine, Oct. 2007.

Farrel, A. et, al., A Framework for Inter-Domain Multiprotocol Label Switching Traffic Engineering, Network Working Group RFC 4726, The IETF Trust, Nov. 2006, pp. 1-22.

Martini, Luca, Dynamic Placement of Pseudowires using a Path Computation Element draft-martini-pwe3-ms-ow-pce001.txt, Network Working Group Cisco System Inc., Oct. 2006.

Bocci, et al., OSPF Extensions for Dynamic Multi-segment Pseudo Wires draft-dolganow-pwe3-ospf-ms-pw-ext-01, Network Working Group, Nov. 29, 2007, Cisco Systems, France.

Vasseur, Path Computation Element (PCE) communication Protocol (PCEP) draft-ietf-pce-pcep-09, Network Working Group, Nov. 16, 2007, Cisco Systems, France.

Farrel, A Path Computation Element (PCE)-Based Architecture, Network Working Group, Aug. 2006, Cisco Systems.

\* cited by examiner

ENHANCING ROUTING OPTIMALITY IN IP NETWORKS REQUIRING PATH ESTABLISHMENT

BACKGROUND OF THE INVENTION

1. Field of the Invention

This invention relates generally to routing in Internet protocol (IP) networks.

2. Description of Related Art

In computer networking, such as IP networks, and telecommunications, multi protocol label switching (MPLS) is a data-carrying mechanism that belongs to the family of packet-switched networks. MPLS operates at an OSI Model layer that is generally considered to lie between traditional definitions of Layer 2 (data link layer) and Layer 3 (network layer), and thus is often referred to as a "Layer 2.5" protocol. MPLS is designed to provide a unified data-carrying service for both circuit-based clients and packet-switching clients which provide a datagram service model. MPLS is used to carry many different kinds of traffic, including IP packets, as well as native asynchronous transfer mode (ATM), synchronous optical networking (SONET), and Ethernet frames.

A Pseudowire (PW) is an emulation of a native service over a Packet Switched Network (PSN). The native service may be a layer 2 or SONET connection, ATM, Frame Relay, Ethernet, low-rate time division multiplexing (TDM), or SONET/SDH, while the PSN may be MPLS, IP (either IPv4 or IPv6), or L2TPv3. More particularly, a PW is a tunnel established between two provider-edge (PE) nodes to transport Layer 2 Protocol Data Units (PDUs) across a PSN.

A multi-segmented PW (MS-PW) is one which traverses multiple PSN domains. i.e. one or more Service Provider (SP) networks, or multiple networks within the same SP network (e.g. an access and core network). More specifically a MS-PW is a static or dynamically configured set of two or more contiguous PW segments that behave and function as a single point-to-point PW. Each end of a MS-PW terminates at an Ultimate Provider Edge (U-PE) device.

The subject matter described herein pertains to routing through a network, including MPLS and MS-PW. Routing is the process of finding a suitable route for conveying data between a source and a destination. Routing can be subject to a set of constraints, such as quality of service, policy or pricing for users of routing services.

Constraint-based path computation is a strategic component of traffic engineering in MPLS networks. It is used to determine the path through the network that traffic should follow, and provides the route for each label switched path (LSP) that is set up.

Path computation has previously been performed either in a management system or at the head-end of each LSP. But path computation in large, multi-domain networks may be very complex and may require more computational power and network information than is usually available at a network element, yet may still need to be more dynamic than can be provided by a management system.

A path computation element (PCE) is defined by the Internet Engineering Task Force (EETF) as an entity (component, application, or network node) that is capable of computing a network path or route based on a network graph and applying computational constraints. Thus, a PCE is an entity capable of computing complex paths for a single or set of services. A PCE might be a network node, network management station, or dedicated computational platform which is aware of the network resources and has the ability to consider multiple constraints for sophisticated path computation. PCE applications include computing label switched paths for MPLS traffic engineering. Thus, PCE has a vision of networks where route computations are more or less separated from actual packet forwarding and could have a vision of a network that ignores temporary conditions, such as router or link failures, causing sub-optimal routing. It should be apparent that there is a need for systems and methods that enhance routing optimality in IP networks requiring path establishment, including those using one or more PCE.

The foregoing objects and advantages of the invention are illustrative of those that can be achieved by the various exemplary embodiments and are not intended to be exhaustive or limiting of the possible advantages which can be realized. Thus, these and other objects and advantages of the various exemplary embodiments will be apparent from the description herein or can be learned from practicing the various exemplary embodiments, both as embodied herein or as modified in view of any variation which may be apparent to those skilled in the art. Accordingly, the present invention resides in the novel methods, arrangements, combinations and improvements herein shown and described in various exemplary embodiments.

SUMMARY OF THE INVENTION

In light of the present need for enhancing routing optimality in IP networks requiring path establishment, a brief summary of various exemplary embodiments is presented. Some simplifications and omission may be made in the following summary, which is intended to highlight and introduce some aspects of the various exemplary embodiments, but not to limit its scope. Detailed descriptions of a preferred exemplary embodiment adequate to allow those of ordinary skill in the art to make and use the invention concepts will follow in later sections.

Various exemplary embodiments include ATM smart permanent virtual circuits (SPVCs). In various such embodiments, an explicit path is provided at the time of commissioning the SPVC. Likewise, in various such embodiments, dynamic routing is used to recover from a failure.

There is a need for systems and methods to dynamically find routable and optimal paths for connection oriented services such as multi-segment pseudo wires. One solution to this problem uses routing protocols to distribute information required to dynamically establish multi-segment pseudo wires. Accordingly, various exemplary embodiments rely on routers to perform path computations. However, such embodiments are limited generally to simple network topologies: For example, various exemplary embodiments function for single AS open shortest path first (OSPF) topologies.

Thus, various exemplary embodiments compute routes based on a current state of a network. However, such an approach often will result in a computed route that is not an optimal route. This is true because temporary failures, decommissioning, and other rerouted paths are routine occurrences in most networks. All of these events would typically result in an alteration of a route computed based on a current state of a network such that the route might not be an optimal route.

Various exemplary embodiments incorporate centralized PCEs. In various exemplary embodiments, PCEs manage network resources and return one or more computed paths through a network based on an optimum operational state even if such an optimal operational state is not a current state of the network. In various exemplary embodiments, the PCE also considers criteria requested from a router when calculating an optimal path.

Many implementations involve complex network topologies. Accordingly, in various exemplary embodiments, one PCE communicates with one or more additional PCEs to determine optimal portions of the overall path. Accordingly, in various exemplary embodiments, an entire optimal path is determined in segments by a plurality of PCEs and the entire optimal path is returned to the router. Further, although less likely to be beneficial and necessary, in various exemplary embodiments a plurality of PCEs are implemented in less complex network topologies. It is believed to be preferable to minimize the number of PCEs used. Thus, it is believed to be preferable to only use a plurality of PCEs when any one PCE would struggle to deal with, the complexity of the topology of the entire path desired.

Based on the foregoing, in various exemplary embodiments, on demand computations are triggered by a route request from path computation clients (PCCs). Likewise, in various exemplary embodiments, a computation of routes is performed by the PCE(s) based on a current state of the network that may be less than optimal. This is true for users described both above and below. Similarly, in various exemplary embodiments, a router communicates with the PCE(s) every time an optimization of a path is attempted. Such embodiments enable a router to make a determination whether an improved path is available each time a path is sought.

BRIEF DESCRIPTION OF THE DRAWINGS

In order to better understand various exemplary embodiments, reference is made to the accompanying drawings, wherein.

DETAILED DESCRIPTION OF THE PREFERRED EMBODIMENTS OF THE INVENTION

Figure 1:
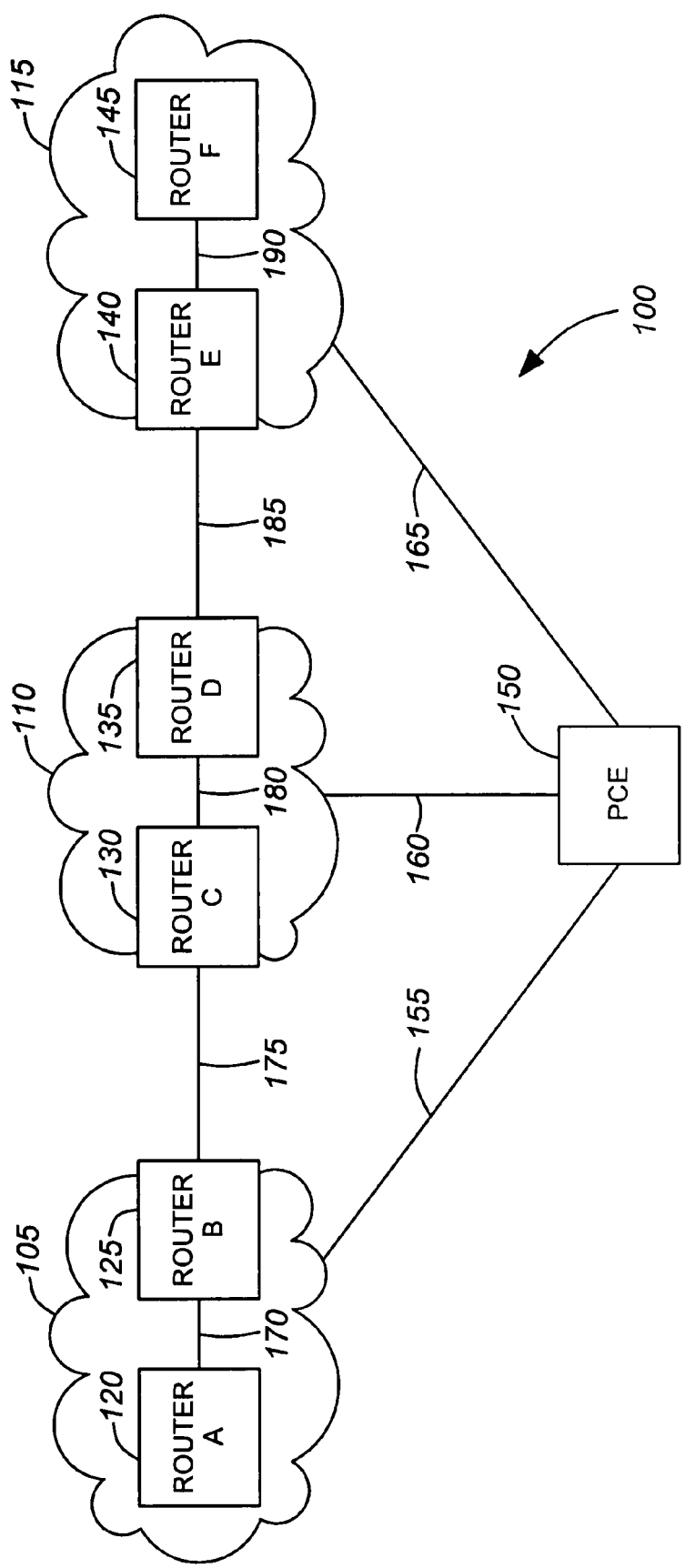
FIG. 1 is a schematic diagram of a first exemplary embodiment of a system for enhancing routing optimality in IP networks requiring path establishment.

Various exemplary embodiments described herein expand upon the path computation element communication protocol (PCEP) model as follows. In various exemplary embodiments, network managers are able to commission paths through an IP network. In various exemplary embodiments, an explicit route through the network is given at the time the path is commissioned through the network. In various exemplary embodiments, the explicit route is computed based on optical network routing. It should be understood that the criteria given in any particular system or application for optimal network routing may vary. Accordingly, it should also be apparent that, in various exemplary embodiments, the criteria for optical network routing are specified.

In various exemplary embodiments, a router attempts to establish a path based on a computed explicit optimum network route. If this optimum route fails, then the router attempts to establish a path that is less than optimal. In various exemplary embodiments, a less than optimal path is established according to any currently known or later developed means. For example, in various exemplary embodiments, less than optimal paths are established using known PCEP or OSPF techniques.

It should also be apparent that, in various exemplary embodiments, the same or similar approaches to establishing a path that is less than optimal are used anytime an established optimal path needs to be rerouted during the lifetime of the optimal path. In a similar manner, it should also be apparent that, in various exemplary embodiments, anytime a path is being used that is less than the optimal path, then attempts are regularly made to switch to the optimal path until such a switch to the optimal path can successfully be accomplished. This will be described now in greater detail with reference to the drawings.

In the drawings, where like numerals refer to like components or steps, there are disclosed broad aspects of various exemplary embodiments.

FIG. 1 is a schematic diagram of a first exemplary embodiment of a system 100 for enhancing routing optimality in IP networks requiring path establishment. The system 100 includes a first network cloud 105, a second network cloud 110, and a third network cloud 115.

Each of the first network cloud 105, second network cloud 110, and third network cloud 115 represent administrative or operational boundaries to a network. Accordingly, in various exemplary embodiments, each of the first network cloud 105, second network cloud 110, and third network cloud 115 represent a summarization implemented within the depicted boundaries. It should be understood that, it is often desirable to implement such administrative or operational boundaries in summarization due to problems of implementation on large scale.

Each of the first network cloud 105, second network cloud 110, and third network cloud 115 are depicted with two routers. Accordingly, the first network cloud 105 includes router A 120 and router B 125, the second network cloud 110 includes router C 130 and router D 135, and the third network cloud 115 includes router E 140 and router F 145.

As depicted in exemplary system 100, router B 125, router C 130, router D 135 and router E 140 are edge nodes in their respective network clouds. Accordingly, router B 125 is an edge node depicted at a right edge of the first network cloud 105, router C is an edge node depicted at a left edge of the second network cloud 110, router D is an edge node depicted at a right edge of the second network cloud 110 and router E 140 is an edge node depicted at a left edge of the third network cloud 115. Router A 120 is a router contained within the boundaries of the first network cloud 105. Similarly, router F 145 is a router contained within the boundaries of the third network cloud 115.

Any given router only has a detailed view of the cloud in which that router resides, not other clouds for which the router would only have a summarized view. Accordingly, router A 120 and router B 125 only have a detailed view of the first cloud 105. Router C 130 and router D 135 only have a detailed view of the second cloud 110. Router E 140 and router F 145 only have a detailed view of the third could 115.

Various exemplary embodiments described herein will be explained in connection with an exemplary communication path desired between router A 120 and router F 145. However, it should be apparent that the exemplary communication discussed herein between router A 120 and router F 145 is intended to be exemplary of virtually any communication path between any two routers in any communication system under the sun.

Similarly, it should be apparent that many more routers exist in each of the first network cloud 105, second network cloud 110, and third network cloud 115, above and beyond the two routers depicted in each of the first network cloud 105, second network cloud 110, and third network cloud 115 in exemplary system 100. Rather, for the sake of simplicity of the figure, only two routers are shown in system 100 for each of the first network cloud 105, second network cloud 110, and third network cloud 115.

Accordingly, it should be understood that communication path 170 from router A 120 to router B 125, in various exemplary embodiments, is not a direct communication path shown. Rather, in various exemplary embodiments, the communication path 170 from router A 120 to router B 125 passes through any number of additional routers within the first network cloud 105 that are not depicted in system 100. Similarly, the communication path 190 from router E 140 to router F 145, in various exemplary embodiments, is not a direct communication path as depicted in system 100, but is a communication path traveling through any number of additional routers or other communication elements that are not shown in system 100. This is again true for the communication path 180 from router C 130 to router D 135 in the second network cloud 110.

It should be understood that the communication path 175 from edge router B 125 to edge router C 130 is a direct communication path in that it is a communication path traveling from one edge router to another edge router between two network clouds, in particular, the first network cloud 105 and the second network cloud 110. Likewise, the communication path 185 from router D 135 to router E 140 is also a direct communication path between two edge routers of separate network clouds.

In various exemplary embodiments, the first network cloud 105, second network cloud I 10, and third network cloud 115 are mapped to OSPF areas. In such embodiments, various routers within the respective clouds could advertise an attachment circuit. The advertised attachment circuits are terminals behind the router to which a PW is attached. Accordingly, attachment circuits are so-called because they are destinations of the router to the PW.

In various exemplary embodiments, attachment circuits and a cloud topology advertised using OSPF get summarized by area border routers 125, 130, 135, 140 before being propagated into neighbouring clouds. However, as such a propagation passes from, for example, router A 120 towards router F 145, the attachment circuit and network topology gets summarized as propagation moves from the first cloud 105 to the second cloud 110, and so on.

Because the overall network communication from router A 120 to router F 145 is divided into smaller portions, whenever the propagation of an attachment circuit and related routing information passes outside one of the first network cloud 105, second network cloud 110, and third network cloud 115, a level of summarization is provided. Otherwise, the network would become too large for any single router. Accordingly, following a propagation such as described above, router F 145 will know that there is a particular attachment circuit address for router A 120 and router F 145 will have summarized information regarding a route that can be traveled to propagate to router A 120 from router F 145.

It should be apparent that dynamic protocols are beneficial because any time the conditions of a network server change, and any time an administrative policy changes, such that the change affects a path between router A 120 and router F 145, such changes often affect the advertisement of the attachment circuit. Accordingly, in OSPF embodiments, router A 120 knows the path to router F 145 based on a current state of the network within a certain timing delay of processing.

In system 100, PCE 150 is in communication with the first network cloud 105 by way of communication path 155. Similarly, the PCE 150 is in communication with the second network cloud 110 through communication path 160. Likewise, the PCE 150 is in communication with the third network cloud 115 through communication path 165. By virtue of communication path 155, communication path 160 and communication path 165, the PCE 150 is able to accumulate un-summarized information from each of the first network cloud 105, second network cloud 110, and third network cloud 115.

Accordingly, PCE 150 has a view over all of the elements in the first network cloud 105, second network cloud 110, and third network cloud 115. Accordingly, PCE 150 is capable of avoiding some level of summarization. This is true because PCE 150 is able to have more information than any communication element residing within the first network cloud 105, second network cloud 110, or third network cloud 115.

As discussed above, elements within each of the first network cloud 105, second network cloud 110 and third network cloud 115, are only able to see un-summarized routing information within themselves. Accordingly, elements within the first network cloud 105 are not able to see detailed information for elements outside the first network cloud 105. This includes elements in the second network cloud 110 and the third network cloud 115. Similarly, communication elements in the second network cloud 110, including router C 130 and router D 135, are not able to see detailed information for communication elements outside of the second network cloud 110, including communication elements in the first network cloud 105 and the third network cloud 115. Likewise, communication elements within the third network cloud 115, including router E 140 and router F 145 are not able to see detailed information for communication elements outside the third network cloud 115, including those communication elements in the first network cloud 105 and second network cloud 110 that are necessary in order to establish the path between router A 120 and router F 145.

Accordingly, the PCE 150 is the only element in system 100 capable of seeing detailed information for all of the communication elements necessary to establish an optimal and current optimal (i.e. one that takes into effect any temporary condition causing sub-optimality) path between router A 120 and router F 145. The functions performed by the various elements depicted in system 100 will be described in greater detail below in connection with FIG. 3.

In various exemplary embodiments, the PCE 150 is implemented inside an existing router. In other exemplary embodiments, the PCE 150 is implemented outside of a router. Thus, in various exemplary embodiments, the PCE 150 is implemented as part of an optimal box. In various exemplary embodiments, the PCE 150 is embedded into a router after being initially implemented outside a router.

Figure 2:
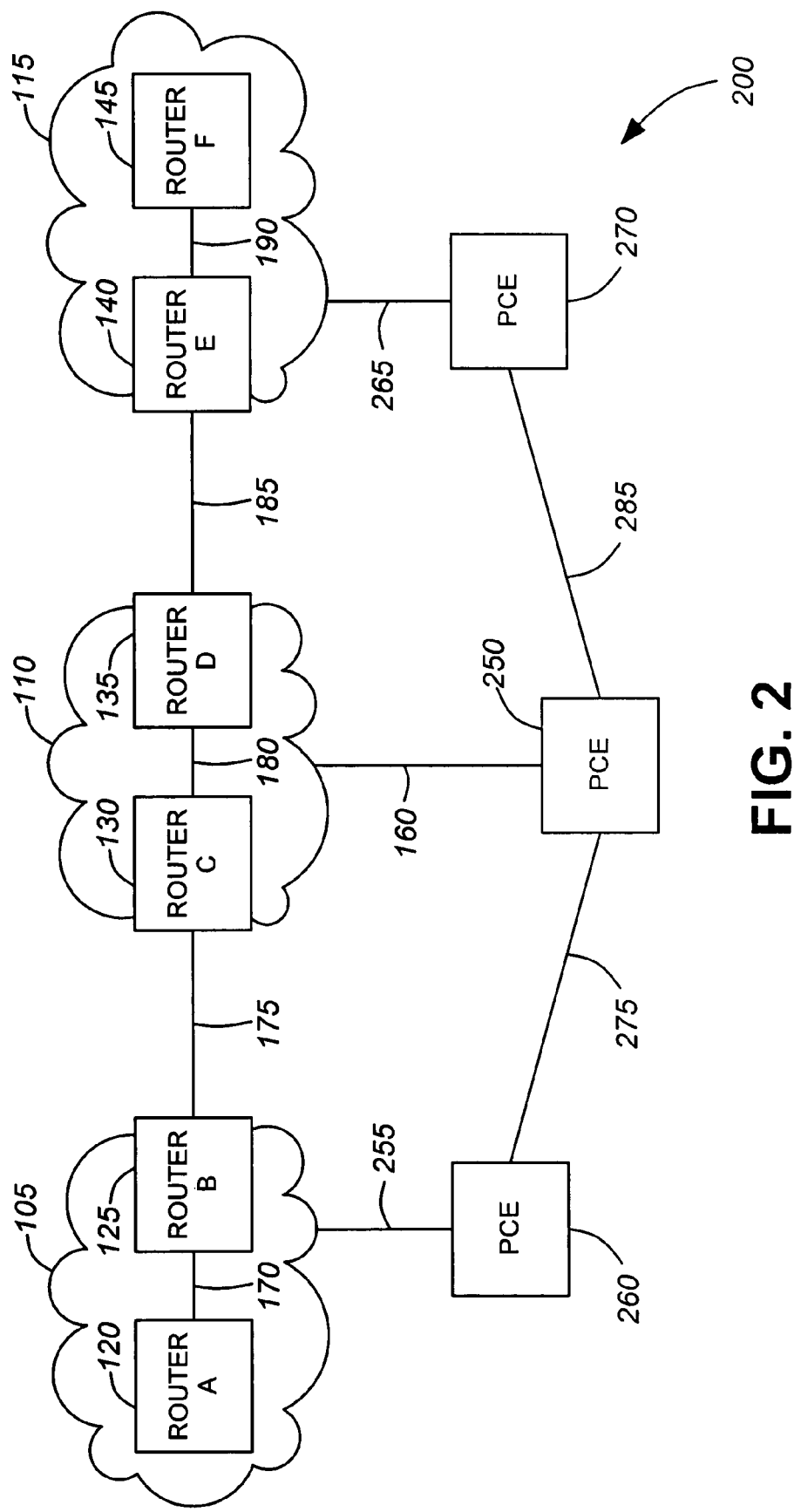
FIG. 2 is a schematic diagram of a second exemplary embodiment of a system for enhancing routing optimality in IP networks requiring path establishment.

FIG. 2 is a schematic diagram of a second exemplary embodiment of a system 200 for enhancing routing optimality in IP networks requiring path establishment. Many of the elements in system 200 are identified using reference numbers also used for elements in system 100. Accordingly, such elements will not be discussed separately in connection with system 200. The discussion of such elements above in connection with system 100 should be understood to apply to the representation of those elements in system 200.

The elements unique to system 200 include PCE 250, PCE 260, PCE 270, communication path 255, communication path 265, communication path 275 and communication path 285. Communication path 275 enables PCE 260 to communicate with PCE 250. Similarly, communication path 285 enables PCE 270 to communicate with PCE 250.

Each of PCE 250, PCE 260 and PCE 270 are in communication with one of the first network cloud 105, second network cloud 110 and third network cloud 115. Specifically, PCE 260 is in communication with the first network cloud 105 through communication path 255. PCE 250 is in communication with the second network cloud 110 through communication path 160. PCE 270 is in communication with the third network cloud 115 through communication path 265.

Accordingly, system 200 represents a system where a plurality of PCEs in communication with each other are able to establish an entire route from router A 120 to router F 145 even though any one of PCE 250, PCE 260 and PCE 270 is not able to see the entire route. Rather, in communication with each other, the PCE 250, PCE 260 and PCE 270 are able to function in unison in a similar manner to PCE 150.

Likewise, the PCE 250, PCE 260 and PCE 270 are implemented in a manner similar to the implementation described above for PCE 150. Accordingly, PCE 150, PCE 250, PCE 260 and PCE 270 are implemented in various exemplary embodiments, in router(s) on the edge(s) of cloud(s), specifically, router B 125, router C 130, router D 135 and/or router E 140. In various exemplary embodiments where the PCE 150, PCE 250, PCE 260 and PCE 270 are implemented in router(s) on the edge(s) of the cloud(s), requests from router A 120 or router F 145 for a best path between the two routers results in connecting together the information obtained separately from the PCEs such that the information is built together. Such embodiments represent another example of a distributed model for the PCEs.

System 200 is believed to be preferable over system 100 in implementations where the complexity of the topology of the first network cloud 105, second network cloud 110, and third network cloud 115 begins to test or exceed operational capabilities of PCE 150. By sharing the load of evaluating the topologies between the three PCEs: 250, 260, 270, system 200 is able to accomplish the same functions as system 100 even where a complexity of the topology of the first network cloud 105, second network cloud 110 and third network cloud 115 exceeds or tests the limits of PCE 150.

It should be apparent that, a nearly limitless number of embodiments exist wherein any one PCE handles the topology in one or more network clouds, and any number of PCEs is combined in communication in order to handle a route from an originating router to a destination router through any number of network clouds. Accordingly, it should be apparent that any one PCE handles the overview of any number of clouds up to its functional limits.

Figure 3:
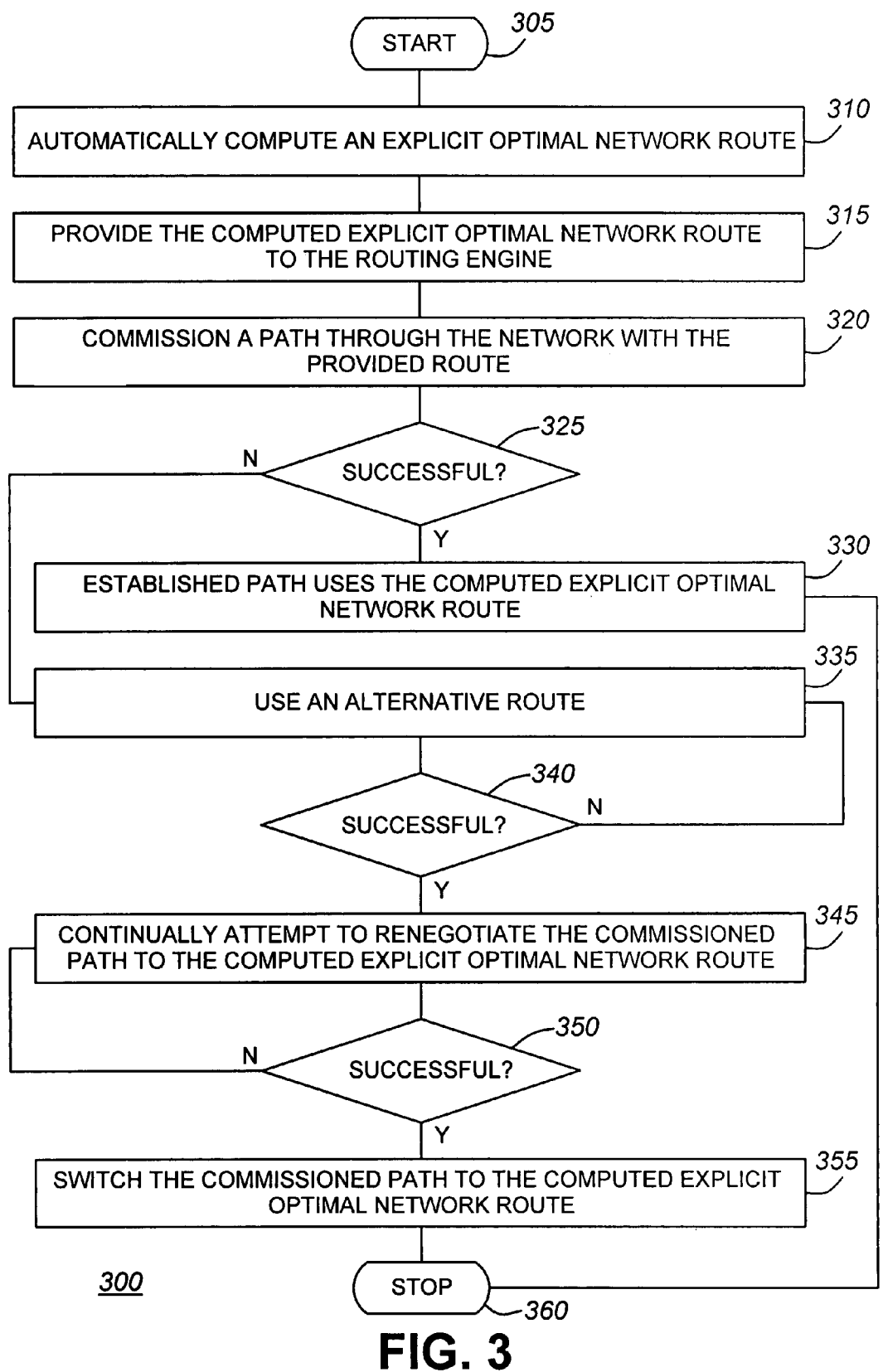
FIG. 3 is a flow chart of an exemplary embodiment of a method for enhancing routing optimality in IP networks requiring path establishment.

FIG. 3 is a flow chart of an exemplary embodiment of a method 300 for enhancing routing optimality in IP networks requiring path establishment. The method 300 starts in step 305 and continues to step 310. In step 310, an explicit optimum network route is computed automatically. This corresponds to the PCE(s) computing an optimal route from router A 120 to router F 145 that passes through path 170 to router B 120, through path 175 to router C 130, through path 180 to router D 135, through path 185 to router E 140, and through path 190 to router F 145.

Following step 310, the method 300 proceeds to step 315. In step 315 the explicit optimal network router computed automatically in step 310 is provided to the routing engine. Accordingly, the explicit optimal network route determined by the PCE(s) is provided to the routing elements.

It should be apparent that step 315 occurs, in various exemplary embodiments, at virtually any time in the existence of a network or plurality of network clouds 105, 110, 115. Accordingly, step 315 is performed in various exemplary embodiments at the time a path is commissioned, before a path is commissioned, after a path is commissioned, and so on. Other examples of when step 315 is performed in various exemplary embodiments include in response to an automatic or manually generated demand or request for a path, any time a topology change or failure of a link affects a path, and any time a router comes on line.

Following step 315, the method 300 proceeds to step 320. In step 320, a path is commissioned through the network with the provided route. Next, in step 325, a determination is made whether the commissioned path through the network using the route provided in step 315 is successful. When a determination is made in step 325 that the path commissioned through the network with the provided route is successful, then the method 300 proceeds to step 330 where the established path uses the computed explicit optimum network route. This represents the ideal situation. Because step 330 represents the ideal situation, following step 330, the method 300 proceeds to step 360 where the method 300 stops. The method 300 can restart again once network topology changes to a level deemed sufficient to re-evaluate optimality of placed paths.

Alternatively, when a determination is made in step 325 that the commissioned path through the network with the provided route is not successful, the method 300 proceeds to step 335. In step 335, an alternative route from router A 120 to router F 145 is used. As discussed above, any known, or later developed alternative to establishing a route is used to establish the route in step 335. For any given route selected for use in step 335, the method 300 proceeds to step 340 where an evaluation is performed whether the alternative route for use from 335 is successfully established between router A 120 and router F 145.

When a determination is made in step 340 that the alternative route selected for use in step 335 is unsuccessful, the method 300 returns to step 335. Then, either the alternative route previously selected for use is attempted anew, or yet another alternative route is selected for use. When a determination is made in step 340 that an alternative route selected for use in step 335 is successfully established between router A 120 and router F 145, the method 300 proceeds to step 345.

In step 345, attempts are continually made to renegotiate the commissioned path to the computed explicit optimal network route. In other words, in various exemplary embodiments, it is recognized that a route is being used that is less than the optimal route. Accordingly, in various exemplary embodiments, attempts are continually made to improve a less than optimal route to the optimal route. Thus, it should be understood that, in various exemplary embodiments, an optimal path runs in the background of the various network elements that are not operating with a current path that is optimal.

In various exemplary embodiments, steps 320 and 335, or variations thereof, are performed simultaneously regardless of the current state of a network. Accordingly, in such embodiments, a request from a router for a path is made with the desire to simultaneously be informed of both an optimal and a current path. In other words, it should be apparent that in various exemplary embodiments, when requesting a path, a router may request either an optimal or a current path, or both.

Following step 345, the method 300 proceeds to step 350. In step 350, an evaluation is made whether the computed explicit optimum network route commissioned in step 320 has been successfully renegotiated. This is very similar to step 325 discussed above. When a determination is made in step 350 that the computed explicit optimal network route was not successfully renegotiated, then the method 300 returns to step 345 where such attempts are continually made.

Eventually, the computed explicit optimum network route will be successfully renegotiated in step 350. When this occurs, the method 300 proceeds to step 355. In step 355, the commissioned path is switched from the alternative route selected for use in step 335 and successfully negotiated in step 340 to the computed explicit optimum network route commissioned in step 320. This corresponds to step 330.

Accordingly, following step 355, the path between router A 120 and router F 145 is the best possible path. Thus, following step 355, the method 300 proceeds to step 360 where the method 300 stops.

Based on the foregoing, various exemplary embodiments enable establishment of optimal paths through a network based on optimal routes that are determined from a configuration of the networks as opposed to a current state of the networks. In various exemplary embodiments, PCEP technology or similar technology could be extended to provide means to deliver the optimal path concept through a push down model. In other words, in various exemplary embodiments, the PCE pushes the route down at the time of commissioning or at any time after that.

In various exemplary embodiments, PCEP or similar technology could be extended to allow a router to request an optimal route in addition to a route that can currently be used to establish a path. Accordingly, in various exemplary embodiments, a pull model can be extended so a router is able to optimize an optimal path without the need to subsequently communicate with a PCE for each attempt at optimizing a route. It should be apparent that such embodiments reduce the operational burden on the PCE(s).

The many advantages of the subject matter described herein should be apparent. For example, various exemplary embodiments introduce predictability to network traffic engineering (TE). In various exemplary embodiments, this is accomplished by providing routers with an optimal route and allowing the routers to optimize to the optimal route anytime a path currently used by the router deviates from the provided optimal route. Another advantage of various exemplary embodiments described herein is that the probability of a circuit being established is maximized while the overhead required to manage re-optimization is simultaneously minimized.

It should be apparent that, various exemplary embodiments minimize signaling overhead. Likewise, it should be apparent that various exemplary embodiments minimize the complexity necessary for path optimization. This is true among other reasons, because routers are provided with an optimal path prior to commissioning.

According to the foregoing, various exemplary embodiments enhance traffic engineering in networks deploying PCE systems. Likewise, various exemplary embodiments distribute an optimization decision to the network. It should be apparent that such embodiments are attractive and beneficial.

Accordingly, various exemplary embodiments are systems and methods implementing PCE controlled IP networks. In various such embodiments, the PCE computes optimal routes for multi-segment pseudo wires. In various such embodiments, the PCE has visibility of the entire network. In various exemplary embodiments, accordingly, it is not necessary for information to be summarized at edges of administrative or operational domains such as first network cloud 105, second network cloud 110, or third network cloud 115.

Various exemplary embodiments provide optimal paths as part of a PCEP response to an on-demand PCEP request for a current path. Likewise, various exemplary embodiments provide an optimal path in a PCEP response or similar message used for a PCE to PCC push model. In some such embodiments the push is optimized only to update paths for nodes that desire to have such an optimized update. In other words, in various exemplary embodiments, a request for a current path to a current destination is made before an optimization is pushed.

Although the various exemplary embodiments have been described in detail with particular reference to certain exemplary aspects thereof, it should be understood that the invention is capable of other different embodiments, and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only, and do not in any way limit the invention, which is defined only by the claims.

What is claimed is:

1. A method of enhancing routing optimality in IP networks requiring path establishment, comprising:

a path computational element automatically computing an explicit optimal network route between a first communication element in a first network cloud and a second communication element in a second network cloud using a network configuration of the first and second network clouds, the first network cloud and the second network cloud each including a plurality of communication elements, and each having boundaries beyond which each of the plurality of communication elements in each network cloud are unable to see a connectivity between any other communication elements outside each respective network cloud, the path computational element having an overview of all communication elements in the network clouds;

the path computational element providing the computed explicit optimal network route to a routing engine;

commissioning a path through the first network cloud and the second network cloud from the first communication element to the second communication element using the provided explicit optimal network route;

establishing a path using the computed explicit optimal network route;

switching to an alternative route that is inferior to the computed explicit optimal network route upon a failure of the computed explicit optimal network route to function properly;

attempting to renegotiate the commissioned path to the computed explicit optimal network route;

determining that the explicit optimal network route is again available; and switching the commissioned path back to the computed explicit optimal network route when that route is determined to be again available.

2. The method of enhancing routing optimality in IP networks requiring path establishment, according to claim 1, wherein the first communication element is a router and the second communication element is also a router.

3. The method of enhancing routing optimality in IP networks requiring path establishment, according to claim 1, wherein automatically computing an explicit optimal network route is performed by a plurality of path computational elements, each of the plurality of path computational elements in communication with one or more other of the plurality of path computational elements, and each of the plurality of path computational elements having a view of all of the plurality of communications elements in at least one of the first network cloud and the second network cloud.

4. The method of enhancing routing optimality in IP networks requiring path establishment, according to claim 1, wherein automatically computing an explicit optimal network route is performed in response to a request received from the first communication element.

5. The method of enhancing routing optimality in IP networks requiring path establishment, according to claim 1, wherein the path computational element is in a router.

6. The method of enhancing routing optimality in IP networks requiring path establishment, according to claim 1, wherein the path computational element is not in a router.

7. The method of enhancing routing optimality in IP networks requiring path establishment, according to claim 1, wherein attempting to renegotiate the commissioned path to the computed explicit optimal network route is performed continually until the attempt is successful.

8. The method of enhancing routing optimality in IP networks requiring path establishment, according to claim 1, wherein the path computational element is in one or more edge nodes of the first network cloud and the second network cloud.

9. The method of enhancing routing optimality in IP networks requiring path establishment, according to claim 1, further comprising one or more additional network clouds through which the explicit optimal network route passes, the one or more additional network clouds each including a plurality of communication elements, and each having boundaries beyond which each of the plurality of communication elements in each network cloud are unable to see a connectivity between any other communication elements outside each respective network cloud.

10. A system for enhancing routing optimality in IP networks requiring path establishment, comprising:
a first network cloud including a plurality of communication elements, one of the plurality of communication elements in the first network cloud being a first communication element, the first network cloud having a boundary beyond which each of the plurality of communication elements in the first network cloud is unable to see a connectivity between any other communication elements outside the first network cloud;
a second network cloud including a plurality of communication elements, one of the plurality of communication elements in the second network cloud being a second communication element, the second network cloud having a boundary beyond which each of the plurality of communication elements in the second network cloud is unable to see a connectivity between any other communication elements outside the second network cloud;
a path computational element that automatically computes an explicit optimal network route between the first communication element in the first network cloud and the second communication element in the second network cloud using a network configuration of the first and second network clouds, the path computational element having an overview of all communication elements in the network clouds, the path computational element providing the computed explicit optimal network route to a routing engine;
a means for commissioning a path through the first network cloud and the second network cloud from the first communication element to the second communication element using the provided explicit optimal network route;
a means for establishing a path using the computed explicit optimal network route;
a means for switching to an alternative route that is inferior to the computed explicit optimal network route upon a failure of the computed explicit optimal network route to function properly;
a means for attempting to renegotiate the commissioned path to the computed explicit optimal network route;
a means for determining that the explicit optimal network route is again available; and
a means for switching the commissioned path back to the computed explicit optimal network route when that route is determined to be again available.

11. The system for enhancing routing optimality in IP networks requiring path establishment, according to claim 10, wherein the first communication element is a router and the second communication element is also a router.

12. The system for enhancing routing optimality in IP networks requiring path establishment, according to claim 10, wherein automatically computing an explicit optimal network route is performed by a plurality of path computational elements, each of the plurality of path computational elements in communication with one or more other of the plurality of path computational elements, and each of the plurality of path computational elements having a view of all of the plurality of communications elements in at least one of the first network cloud and the second network cloud.

13. The system for enhancing routing optimality in IP networks requiring path establishment, according to claim 10, wherein automatically computing an explicit optimal network route is performed in response to a request received from the first communication element.

14. The system for enhancing routing optimality in IP networks requiring path establishment, according to claim 10, wherein the path computational element is in a router.

15. The system for enhancing routing optimality in IP networks requiring path establishment, according to claim 10, wherein the path computational element is not in a router.

16. The system for enhancing routing optimality in IP networks requiring path establishment, according to claim 10, wherein attempting to renegotiate the commissioned path to the computed explicit optimal network route is performed continually until the attempt is successful.

17. The system for enhancing routing optimality in IP networks requiring path establishment, according to claim 10, wherein the path computational element is in one or more edge nodes of the first network cloud and the second network cloud.

18. The system for enhancing routing optimality in IP networks requiring path establishment, according to claim 10, further comprising one or more additional network clouds through which the explicit optimal network route passes, the one or more additional network clouds each including a plurality of communication elements, and each having boundaries beyond which each of the plurality of communication elements in each network cloud are unable to see a connectivity between any other communication elements outside each respective network cloud.

19. The system for enhancing routing optimality in IP networks requiring path establishment, according to claim 10, wherein the path is multi-segment pseudo wire and the commissioned path includes a plurality of pseudo wire segments combined into a single path.

20. The system for enhancing routing optimality in IP networks requiring path establishment, according to claim 19, wherein the pseudo wire segments are established using MPLS.

21. A method of enhancing routing optimality in IP networks requiring path establishment, comprising:

a path computational element automatically computing an explicit optimal network route between a first communication element in a first network cloud and a second communication element in a second network cloud using a current operational state of the first and second network clouds, the first network cloud and the second network cloud each including a plurality of communication elements, and each having boundaries beyond which each of the plurality of communication elements in each network cloud are unable to see a connectivity between any other communication elements outside each respective network cloud, the path computational element having an overview of all communication elements in the network clouds;

the path computational element providing the computed explicit optimal network route to a routing engine;

commissioning a path through the first network cloud and the second network cloud from the first communication element to the second communication element using the provided explicit optimal network route;

establishing a path using the computed explicit optimal network route;

switching to an alternative route that is inferior to the computed explicit optimal network route upon a failure of the computed explicit optimal network route to function properly;

attempting to renegotiate the commissioned path to the computed explicit optimal network route;

determining that the explicit optimal network route is again available; and switching the commissioned path back to the computed explicit optimal network route when that route is determined to be again available.

22. A system for enhancing routing optimality in IP networks requiring path establishment, comprising:

a first network cloud including a plurality of communication elements, one of the plurality of communication elements in the first network cloud being a first communication element, the first network cloud having a boundary beyond which each of the plurality of communication elements in the first network cloud is unable to see a connectivity between any other communication elements outside the first network cloud;

a second network cloud including a plurality of communication elements, one of the plurality of communication elements in the second network cloud being a second communication element, the second network cloud having a boundary beyond which each of the plurality of communication elements in the second network cloud is unable to see a connectivity between any other communication elements outside the second network cloud;

a path computational element that automatically computes an explicit optimal network route between the first communication element in the first network cloud and the second communication element in the second network cloud using a current operational state of the first and second network clouds, the path computational element having an overview of all communication elements in the network clouds, the path computational element providing the computed explicit optimal network route to a routing engine;

a means for commissioning a path through the first network cloud and the second network cloud from the first communication element to the second communication element using the provided explicit optimal network route;

a means for establishing a path using the computed explicit optimal network route;

a means for switching to an alternative route that is inferior to the computed explicit optimal network route upon a failure of the computed explicit optimal network route to function properly;

a means for attempting to renegotiate the commissioned path to the computed explicit optimal network route;

a means for determining that the explicit optimal network route is again available; and a means for switching the commissioned path back to the computed explicit optimal network route when that route is determined to be again available.

* * * * *